(12) United States Patent
Braithwaite et al.

(10) Patent No.: US 8,808,410 B2
(45) Date of Patent: Aug. 19, 2014

(54) HYDROGEN GENERATOR AND PRODUCT CONDITIONING METHOD

(75) Inventors: Daniel Braithwaite, San Francisco, CA (US); Matthieu Jonemann, San Francisco, CA (US); Tibor Fabian, Mountain View, CA (US)

(73) Assignee: Intelligent Energy Limited (GB)

( * ) Notice: Subject to any disclaimer, the term of this patent is extended or adjusted under 35 U.S.C. 154(b) by 849 days.

(21) Appl. No.: 12/916,329

(22) Filed: Oct. 29, 2010

(65) Prior Publication Data

US 2011/0070151 A1  Mar. 24, 2011

Related U.S. Application Data

(63) Continuation-in-part of application No. 12/460,794, filed on Jul. 23, 2009, now abandoned, and a continuation-in-part of application No. 12/803,965, filed on Jul. 9, 2010.

(51) Int. Cl.
*C01B 6/24* (2006.01)
*C01B 3/00* (2006.01)
*C01B 3/06* (2006.01)

(52) U.S. Cl.
CPC .................................. *C01B 3/065* (2013.01); Y02E 60/362 (2013.01)
USPC ............. 48/61; 423/644; 423/657; 423/658.2

(58) Field of Classification Search
USPC ............................................................ 48/61
See application file for complete search history.

(56) References Cited

U.S. PATENT DOCUMENTS

| | | | |
|---|---|---|---|
| 3,262,801 A | 7/1966 | Lally et al. |
| 3,774,589 A | 11/1973 | Kober |
| 4,042,528 A | 8/1977 | Abe |
| 4,261,956 A | 4/1981 | Adlhart |
| 4,419,457 A | 12/1983 | Tokunaga |
| 4,846,176 A | 7/1989 | Golden |
| 5,182,046 A | 1/1993 | Patton et al. |
| 5,804,329 A | 9/1998 | Amendola |
| 5,817,157 A | 10/1998 | Checketts |

(Continued)

FOREIGN PATENT DOCUMENTS

| | | |
|---|---|---|
| DE | 4221492 A | 1/1993 |
| EP | 1434292 A | 6/2004 |

(Continued)

OTHER PUBLICATIONS

D.J. Laser and J.G. Santiago, "A Review of Micropumps", J. Micromech. Microeng.; vol. 14 (2004) R35-R64.
Ying,Wu, "Hydrogen Storage via Sodium Borohydride: Current Status, Barriers & R&D Roadmap", Presentation presented at GCEP, Stanford University, Apr. 14-15, 2003.
Laser et al., "A Review of Micropumps," J. Micromech. Microeng.; vol. 14 (2004) R35-R64.

(Continued)

*Primary Examiner* — Matthew Merkling
(74) *Attorney, Agent, or Firm* — Baker Hostetler LLP

(57) ABSTRACT

A hydrogen generator that includes a solid fuel mixture, a liquid reactant, a liquid delivery medium (LDM), a movable boundary interface (MBI), a reaction zone, wherein the MBI provides constant contact between a reacting surface of the solid fuel mixture and the liquid reactant delivered by the LDM to form the reaction zone, and a product separation media, fluidly coupled to the reaction zone by a fluid junction, that degasses a product. The hydrogen generator may further include auxiliary LDMs disposed throughout the hydrogen generator, wherein said auxiliary LDMs may be operated based on a ratio of the liquid reactant flow rate to the hydrogen generation rate.

15 Claims, 8 Drawing Sheets

(56) References Cited

U.S. PATENT DOCUMENTS

| | | | |
|---|---|---|---|
| 5,948,558 A | 9/1999 | Amendola | |
| 6,106,801 A | 8/2000 | Bogdanovic et al. | |
| 6,250,078 B1 | 6/2001 | Amendola | |
| 6,326,097 B1 | 12/2001 | Hockaday | |
| 6,375,638 B2 | 4/2002 | Nason | |
| 6,392,313 B1 | 5/2002 | Epstein | |
| 6,433,129 B1 | 8/2002 | Amendola | |
| 6,468,694 B1 | 10/2002 | Amendola | |
| 6,497,973 B1 | 12/2002 | Amendola | |
| 6,524,542 B2 | 2/2003 | Amendola | |
| 6,534,033 B1 | 3/2003 | Amendola | |
| 6,534,950 B2 | 3/2003 | Leboe | |
| 6,544,400 B2 | 4/2003 | Hockaday | |
| 6,544,679 B1 | 4/2003 | Petillo | |
| 6,579,068 B2 | 6/2003 | Bridger | |
| 6,586,563 B1 | 7/2003 | Ortega | |
| 6,645,651 B2 | 11/2003 | Hockaday | |
| 6,660,685 B1 | 12/2003 | Schussler | |
| 6,670,444 B2 | 12/2003 | Amendola | |
| 6,683,025 B2 | 1/2004 | Amendola | |
| 6,706,909 B1 | 3/2004 | Snover | |
| 6,713,201 B2 | 3/2004 | Bullock | |
| 6,723,072 B2 | 4/2004 | Flaherty | |
| 6,745,801 B1 | 6/2004 | Cohen | |
| 6,746,496 B1 | 6/2004 | Kravitz et al. | |
| 6,808,833 B2 | 10/2004 | Johnson | |
| 6,818,334 B2 | 11/2004 | Tsang | |
| 6,821,499 B2 | 11/2004 | Jorgensen | |
| 6,834,623 B2 | 12/2004 | Cheng | |
| 6,834,632 B2 | 12/2004 | Kataoka | |
| 6,840,955 B2 | 1/2005 | Ein | |
| 6,849,351 B2 | 2/2005 | Hartnack | |
| 6,887,596 B2 | 5/2005 | Leban | |
| 6,893,755 B2 | 5/2005 | Leboe | |
| 6,916,159 B2 | 7/2005 | Rush | |
| 6,924,054 B2 | 8/2005 | Prasad | |
| 6,932,847 B2 | 8/2005 | Amendola et al. | |
| 6,939,529 B2 | 9/2005 | Strizki et al. | |
| 7,019,105 B2 | 3/2006 | Amendola et al. | |
| 7,083,657 B2 | 8/2006 | Mohring et al. | |
| 7,105,033 B2 | 9/2006 | Strizki | |
| 7,105,245 B2 | 9/2006 | Ohlsen | |
| 7,108,777 B2 | 9/2006 | Xu et al. | |
| 7,214,439 B2 | 5/2007 | Ortega et al. | |
| 7,220,290 B2 | 5/2007 | Amendola et al. | |
| 7,282,073 B2 | 10/2007 | Petillo et al. | |
| 7,316,718 B2 | 1/2008 | Amendola et al. | |
| 7,316,719 B2 | 1/2008 | Devos | |
| 7,323,148 B2 | 1/2008 | Shah et al. | |
| 7,393,369 B2 | 7/2008 | Shurtleff | |
| 7,527,661 B2 | 5/2009 | Chellappa et al. | |
| 7,530,931 B2 | 5/2009 | Amendola et al. | |
| 7,540,892 B2 | 6/2009 | Strizki et al. | |
| 7,645,536 B2 | 1/2010 | Akiyama | |
| 7,662,435 B2 | 2/2010 | Chellappa et al. | |
| 7,666,386 B2 | 2/2010 | Withers-Kirby | |
| 7,811,529 B2 | 10/2010 | Powell et al. | |
| 7,867,300 B2 | 1/2011 | Chellappa et al. | |
| 7,875,089 B2 | 1/2011 | Powell et al. | |
| 7,922,781 B2 | 4/2011 | Chellappa et al. | |
| 7,954,519 B2 | 6/2011 | Powell et al. | |
| 8,100,993 B2 | 1/2012 | Fisher et al. | |
| 2002/0114985 A1 | 8/2002 | Shkolnik et al. | |
| 2002/0182459 A1* | 12/2002 | Hockaday et al. | 429/19 |
| 2003/0009942 A1 | 1/2003 | Amendola | |
| 2003/0022034 A1 | 1/2003 | Suzuki | |
| 2003/0037487 A1 | 2/2003 | Amendola | |
| 2003/0077494 A1 | 4/2003 | Aberle et al. | |
| 2003/0082427 A1 | 5/2003 | Prasad | |
| 2003/0091879 A1 | 5/2003 | Rusta-Sellehy et al. | |
| 2003/0138679 A1 | 7/2003 | Prasad | |
| 2003/0198558 A1 | 10/2003 | Nason | |
| 2003/0235724 A1 | 12/2003 | Ord | |
| 2004/0011662 A1 | 1/2004 | Xu | |
| 2004/0013923 A1 | 1/2004 | Molter et al. | |
| 2004/0048115 A1 | 3/2004 | Devos |
| 2004/0048132 A1 | 3/2004 | Takai et al. |
| 2004/0052704 A1 | 3/2004 | Devos |
| 2004/0062965 A1 | 4/2004 | Morse |
| 2004/0062978 A1 | 4/2004 | Yazici |
| 2004/0096721 A1 | 5/2004 | Ohlsen et al. |
| 2004/0131903 A1 | 7/2004 | Shioya |
| 2004/0136156 A1 | 7/2004 | Nakamura et al. |
| 2004/0148857 A1 | 8/2004 | Strizki |
| 2004/0197214 A1 | 10/2004 | Arthur |
| 2004/0202548 A1 | 10/2004 | Dai |
| 2004/0211054 A1 | 10/2004 | Morse |
| 2004/0219409 A1 | 11/2004 | Isogai |
| 2004/0229101 A1 | 11/2004 | Davis |
| 2004/0253500 A1 | 12/2004 | Bourilkov |
| 2005/0023236 A1 | 2/2005 | Adams et al. |
| 2005/0031931 A1 | 2/2005 | Kabumoto et al. |
| 2005/0036941 A1 | 2/2005 | Bae et al. |
| 2005/0037245 A1 | 2/2005 | Pham |
| 2005/0037252 A1 | 2/2005 | Pham |
| 2005/0074641 A1 | 4/2005 | Inai et al. |
| 2005/0089415 A1 | 4/2005 | Cho |
| 2005/0158595 A1 | 7/2005 | Marsh et al. |
| 2005/0181250 A1 | 8/2005 | Beckmann et al. |
| 2005/0238573 A1 | 10/2005 | Zhang et al. |
| 2006/0059778 A1 | 3/2006 | Shurtleff et al. |
| 2006/0073365 A1 | 4/2006 | Kaye |
| 2006/0110639 A1 | 5/2006 | Walter |
| 2006/0127734 A1 | 6/2006 | McLean |
| 2006/0172694 A1 | 8/2006 | Gau et al. |
| 2006/0194082 A1 | 8/2006 | Tucker et al. |
| 2006/0196112 A1 | 9/2006 | Berry |
| 2006/0275645 A1 | 12/2006 | Gallagher |
| 2007/0002172 A1 | 1/2007 | Calvignac et al. |
| 2007/0020172 A1 | 1/2007 | Withers-Kirby |
| 2007/0031711 A1 | 2/2007 | Miyata et al. |
| 2007/0036711 A1 | 2/2007 | Fisher et al. |
| 2007/0037034 A1 | 2/2007 | Fisher et al. |
| 2007/0042244 A1 | 2/2007 | Spallone |
| 2007/0068071 A1 | 3/2007 | Kelly et al. |
| 2007/0120872 A1 | 5/2007 | Satoh |
| 2007/0122668 A1 | 5/2007 | Suzuki et al. |
| 2007/0166595 A1 | 7/2007 | Akiyama et al. |
| 2007/0189960 A1 | 8/2007 | Yamamoto |
| 2007/0264546 A1 | 11/2007 | Laven |
| 2008/0025880 A1 | 1/2008 | Shurtleff et al. |
| 2008/0044691 A1 | 2/2008 | Wake et al. |
| 2008/0187798 A1 | 8/2008 | Mclean et al. |
| 2008/0203816 A1 | 8/2008 | Fujita |
| 2008/0220297 A1 | 9/2008 | Sarata et al. |
| 2008/0292541 A1 | 11/2008 | Kamada et al. |
| 2009/0092864 A1 | 4/2009 | Mclean et al. |
| 2009/0117420 A1 | 5/2009 | Nakakubo |
| 2009/0197125 A1 | 8/2009 | Salvador et al. |
| 2009/0269634 A1 | 10/2009 | Fabian et al. |
| 2009/0274595 A1 | 11/2009 | Fisher et al. |
| 2009/0304558 A1 | 12/2009 | Patton et al. |
| 2010/0150824 A1 | 6/2010 | Withers-Kirby |
| 2010/0173214 A1 | 7/2010 | Fabian et al. |
| 2011/0020215 A1 | 1/2011 | Ryu et al. |
| 2011/0053016 A1 | 3/2011 | Braithwaite et al. |
| 2011/0159386 A1 | 6/2011 | Kaupert et al. |
| 2011/0200495 A1 | 8/2011 | Braithwaite et al. |
| 2011/0311895 A1 | 12/2011 | Spare et al. |
| 2011/0313589 A1 | 12/2011 | Iyer et al. |
| 2012/0100443 A1 | 4/2012 | Braithwaite et al. |

FOREIGN PATENT DOCUMENTS

| | | |
|---|---|---|
| JP | 2002234358 A | 8/2002 |
| JP | 2002/234358 | 1/2006 |
| JP | 2006079891 A | 3/2006 |
| JP | 2007157587 A | 6/2007 |
| WO | 00128889 A1 | 3/2000 |
| WO | 04/001235 | 12/2003 |
| WO | 04001235 A | 12/2003 |
| WO | 2004/062978 | 4/2004 |
| WO | 2005049485 A | 6/2005 |
| WO | 2005057703 A | 6/2005 |

(56) References Cited

FOREIGN PATENT DOCUMENTS

| WO | 2005123586 A | 12/2005 |
|---|---|---|
| WO | 2006093735 A | 9/2006 |
| WO | 2007021924 A | 2/2007 |
| WO | 2007021934 A | 2/2007 |
| WO | 2007035845 A | 3/2007 |
| WO | 2007055146 A | 5/2007 |
| WO | 2007109036 A | 9/2007 |
| WO | 2007120872 A | 10/2007 |
| WO | 2011011050 A | 1/2011 |
| WO | 2011028242 A | 3/2011 |
| WO | 2012054787 A | 4/2012 |
| WO | 2012058688 A | 5/2012 |

OTHER PUBLICATIONS

Wu, "Hydrogen Storage via Sodium Borohydride: Current Status, Barriers & R&D Roadmap," Presentation presented at GCEP, Stanford University, Apr. 14-15, 2003.

Definition of course work technical terms. Southwest Tech, 2002-2006. [Retrieved on Feb. 8, 2012]. Retrieved from the Internet <URL: http://www.swtc.edu/Ag_Power/hydraulics/terms.htm.

Schlesinger et al, "Sodium Borohydride, Its Hydrolysis and its Use as a Reducing Agent and in the Generation of Hydrogen," J. Am. Chem. Soc.; vol. 75 (Mar. 15, 1952), pp. 215-219.

Written Opinion of te International Searching Authority for PCT/US2010/02022.

* cited by examiner

HYDROGEN GENERATOR AND PRODUCT CONDITIONING METHOD

CROSS-REFERENCE TO RELATED APPLICATIONS

This application is a continuation-in-part of U.S. patent application Ser. No. 12/460,794 filed on 23 Jul. 2009, and U.S. patent application Ser. No. 12/803,965 filed on 9 Jul. 2010, which are incorporated in their entirety by this reference.

DESCRIPTION OF THE PREFERRED EMBODIMENTS

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 1:
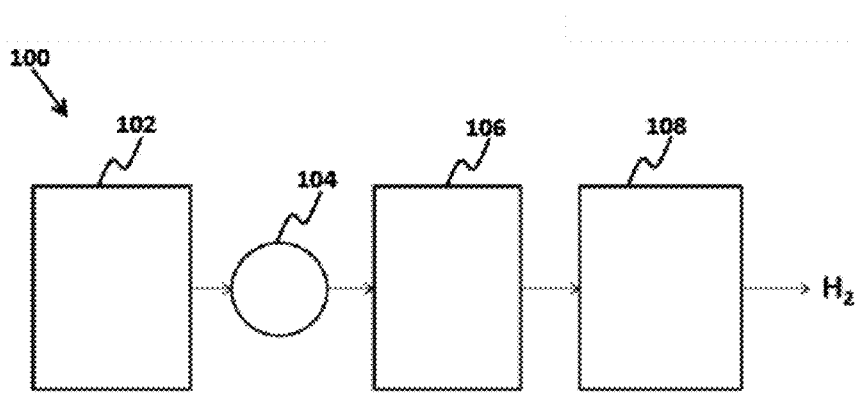
FIG. 1 shows a schematic diagram of a hydrogen generation system according to the present invention.
Figure 2:
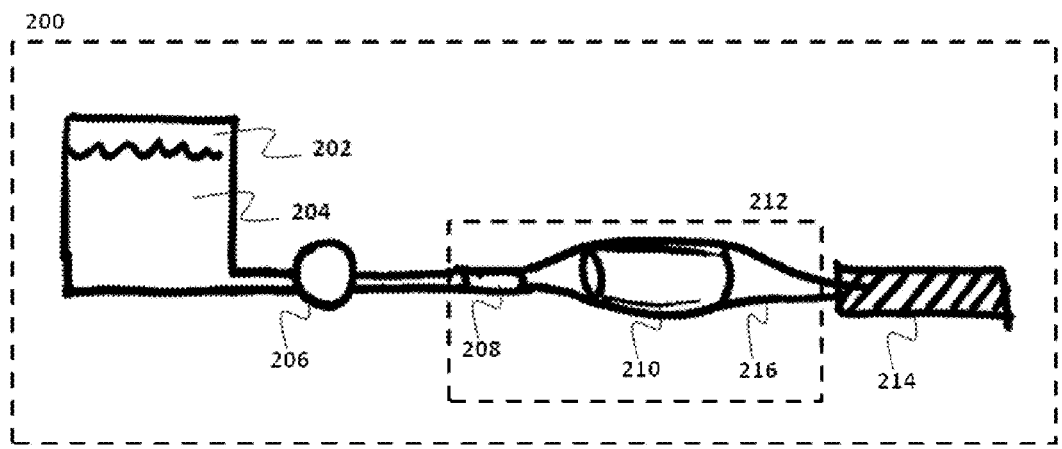
FIG. 2 shows a schematic representation of an embodiment of the hydrogen generation system.

FIG. 1 shows a schematic diagram of a hydrogen generator system 100 having storage 102 for a liquid reactant, a pump 104, a fuel/reaction chamber 106, and product separation media 108, according to the present invention. As shown in FIG. 2, the reaction chamber 212 contains a fuel mixture 210 and reaction control mechanism 216 including liquid delivery media (LDM) 208 and means to localize sodium borohydride (SBH) reaction. The fuel mixture is in its non-liquid form such as powder, particles, compacted solid, slurry, or paste, and preferably comprises of sodium borohydride. The LDM can be a nozzle, wick, spray, tube, or any other suitable device, and can be either in contact or proximate to the fuel mixture. A reactant liquid (preferably deionized or distilled water, but alternatively may be an acid such as citric acid, succinic acid, malic acid or boric acid) is delivered via a pump 206 to the fuel mixture to initiate the hydrolysis of a fuel to generate hydrogen. Hydrogen generation rate is mainly controlled by the pumping rate of a liquid reactant into a reaction chamber 212. At a controlled pumping rate, a liquid reactant enters into a reaction chamber guided by an LDM and hydrolysis reaction is initiated at its interface with a fuel mixture. Delivery of a liquid reactant to a fuel mixture can be achieved by direct injection, dripping, spraying, or wetting of an LDM. An LDM can be a rigid or flexible medium including single or multiple of rods, tubes, bars, or sheets. The SBH hydrolysis produces a mixture of boron oxide precipitates, viscous paste of additives, and hydrogen gas. This mixed product is filtered through product separation media allowing only hydrogen gas to leave the system.

The invention further includes reaction control mechanisms to ensure the stable and repeatable performance of a hydrogen system for both continuous and on/off operation. Stable hydrogen generation relies on how uniform and constant reaction interface is maintained between a fuel and liquid reactant. Most of SBH-based hydrogen systems use an alkaline-stabilized SBH solution as its fuel. The reaction control of such a liquid fuel is achieved by pumping a designated amount of the fuel to catalysts. However, the solution type SBH fuel is less favored due to its low energy density. While solid fuels have higher energy density, their further development has been hampered by difficulty in achieving reliable reaction control. The reaction control of a solid SBH system relies on both the pumping rate of liquid reactants and the size of a reaction interface. In practical cases, volatile hydrolysis reaction at the interface leaves cavities or voids when the generated products flow away from the interface. This results in a non-contact between a fuel surface and liquid delivery medium. When this occurs, the performance of hydrogen generation system degrades over time. The performance of the fuel system becomes unpredictable when it is restarted after a stop period from the previous run. Typically, when the fuel system is investigated after its operation for a certain period, large gaps or voids are observed between the non-reacted surface of the solid fuel and the liquid delivery medium (LDM) such as a nozzle, wick, or membrane. This lack of control in maintaining constant and intact boundary between a solid fuel and liquid delivery medium has been the largest obstacle to achieving reliable performance of a solid fuel system.

Figure 3:
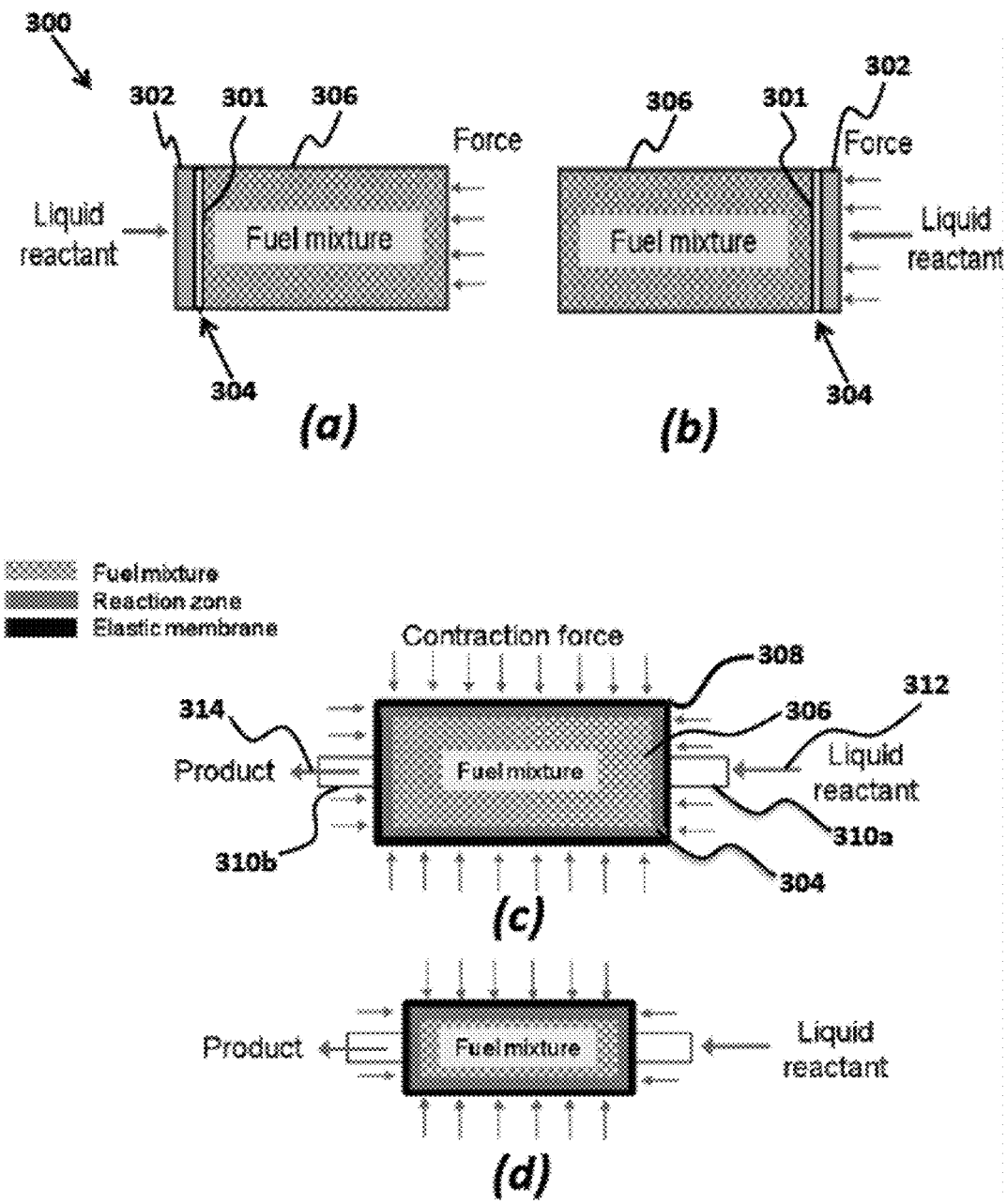
FIGS. 3a-3d show exemplary moving boundary interface (MBI) designs according to the present invention.

To address these issues, a moving boundary interface (MBI) is provided that ensures constant contact between a solid fuel and LDM. The MBI includes either physically bringing the reacting surface of a solid fuel in contact with a stationary LDM or bringing an LDM in contact with the varying contour of the reacting surface of a solid fuel. Physically moving one boundary to another includes, but is not limited, to spring force, gas (preferably $H_2$) pressure, or elastic membrane. FIGS. 3a-3d show schematic diagrams of example moving boundary interface (MBI) designs. MBI systems 300 use compression force on at least one side of a solid fuel mixture. A compression force can be applied either to the side close to reaction zone or the opposite side of the fuel mixture. Other example utilizes an elastic membrane to apply compression force around a solid fuel mixture. When a fuel mixture is consumed and decreases in its volume, the elastic membrane shrinks and maintains its continuous contact to the surface of a fuel mixture. FIGS. 3a-3b show one embodiment of an MBI system 300 having an MBI 301 that utilizes compression force in order to maintain a constant contact between LDM 302 and the unreacted surface (reaction zone) 304 of the SBH fuel mixture 306. The compression force can be applied either to the opposite side of the LDM 302 (as shown in FIG. 3a) or the LDM side (as shown in FIG. 3b). At the LDM/reaction zone interface 302/304, the hydrolysis occurs and its products are generated. However, the constant compression between the LDM 320 and the surface of the SBH mixture 306 pushes the product away from the LDM/reaction zone interface 302/304 and maintain continuous contact with the unreacted portion of the fuel mixture. FIGS. 3c-3d show another embodiment of an MBI system 300 based on an enclosure made of an elastic membrane 306. Prior to SBH hydrolysis, the elastic membrane 308 tightly encloses a solid fuel mixture 306 (as shown in FIG. 3c). An LDM 310a/310b or engineered path for reactants/products is typically assembled/structured between the surface of the fuel mixture 306 and the elastic MBI 308. When a liquid reactant 312 is pumped into a system, the reaction occurs at the interface between the MBI 308 and LDM 310a. As the reaction progresses further, the volume of the fuel mixture 306 decreases (as shown in FIG. 3b) since the products 314 are continuously pushed away from the reaction zone 304. The elastic membrane 308 shrinks over this varying contour of the fuel mixture 306, providing a continuous contact between the surface of the fuel mixture 306 and the LDM 310a/310b. A desired material to form an MBI 308 should be able to conform to the surface of a shrinking fuel mixture 306. Candidate materials include, but are not limited to, any elastic or rubbery materials (such as latex, silicone, viton, polyurethane, neoprene, buna-N, PTFE, ePTFE, perfluoroelastomer, fluorosilicone, Aflas, or Hytrel . . . etc), elastic fabrics, heat shrinkable fabrics, or spring sheets.

Figure 4:
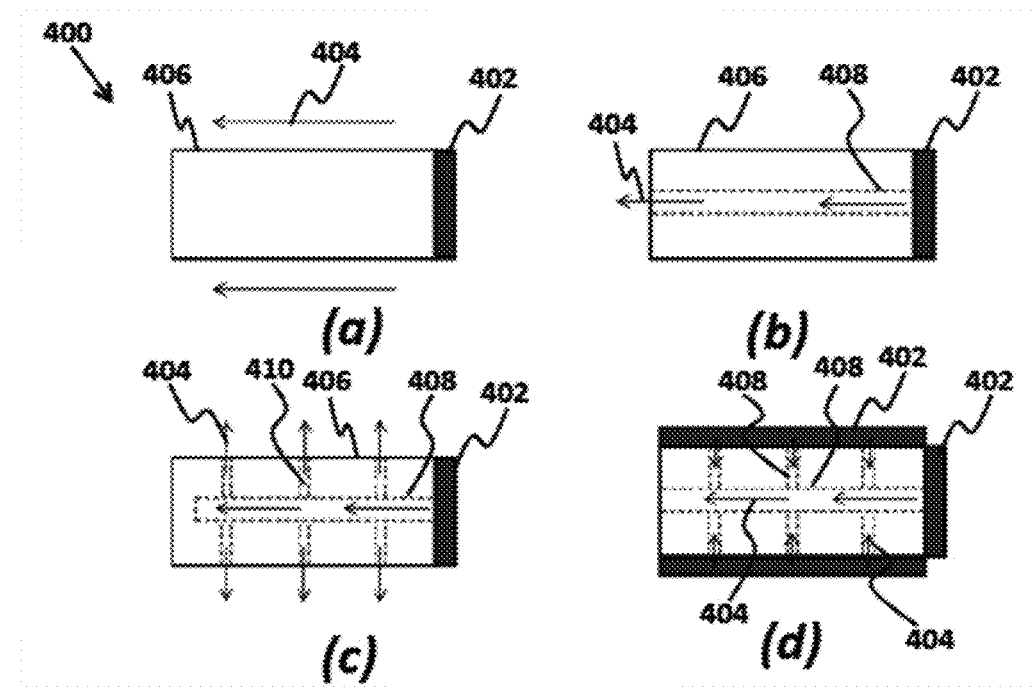
FIGS. 4a-4d show examples of product-guide design in a solid fuel mixture (cylindrical shape), according to the present invention.

When a non-liquid fuel is employed and the hydrolysis reaction is induced at any surface of the solid fuel, the hydrolysis products need to be continuously removed from a reaction zone to ensure a clean contact between an LDM and the unreacted surface of the solid fuel. Providing clear and engineered pathways for product removal prevents any unexpected failure such as uncontrolled pressure buildup due to the product clogging, the entry disruption of liquid reactants, or the uncontrolled form-factor dismantling of a solid fuel. According to the current invention, for product removal of a non-liquid fuel is provided. FIGS. 4a-4d show schematic diagrams of examples of product-guide designs 400 in a solid fuel mixture (cylindrical shape). Products are guided outside fuel surface, through internal guide, from internal guide to outside through holes to sides, or from outside to inside, thus illustrating how hydrolysis products can be removed from a reaction zone in multiple ways. In one embodiment, when SBH hydrolysis reaction occurs at one side of a cylindrical fuel 402, its resulting products 404 can be guided externally around the fuel body 406 using a number of configurations such as through internal conduits 408 (see FIG. 4b), from internal conduits 408 to outside through holes 410 in a radial direction (as shown in FIG. 4c), or from a reaction zone 402 at the outside surface of a fuel cylinder to internal conduits 412, and to outside again (as shown in FIG. 4d).

Figure 5:
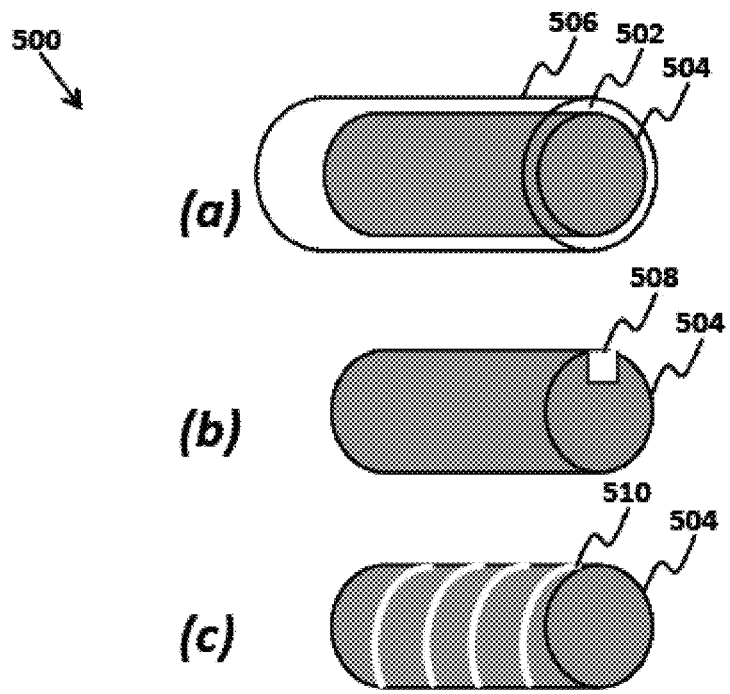
FIGS. 5a-5c show examples of engineered guides for product disposal according to the present invention.

The detailed dimension and pattern of this product guide can be further engineered for the operation conditions of each fuel system. FIGS. 5a-5c show examples of engineered guides for product disposal 500. Hydrolysis occurs on at least one side of a fuel mixture, then product flow is generated and exits through features such as a concentric gap between a fuel mixture and the enclosure, channels shaped on the fuel body, or spiral channels shaped on the fuel body for orientation-independent performance. For example, a gap 502 disposed between the fuel surface 504 and enclosure 506 (see FIG. 5a) can act as a product guide. When hydrolysis occurs either on a radial or longitudinal side of the cylindrical fuel, the concurrently-generated products can flow through the concentric gap 502 and exit the fuel zone (not shown). Another embodiment (see FIG. 5b) shows at least one engineered channel 508 structured in the compacted body of a fuel mixture 504. Further detailed dimension and geometry of this channel 509 can determine the flow kinetics of products and allow fine tuning of product disposal. Another embodiment (see FIG. 5c) shows a spiral channel 510 structured on the body of a fuel mixture 504 in order to mitigate orientation-dependency in the product disposal.

Orientation-dependent consumption at a certain location of a fuel (e.g. due to gravity) often causes the uncontrolled dismantling of the fuel form factor, resulting in uncontrolled hydrogen generation. Even when the pumping rate of a liquid reactant is maintained constant, orientation change of the system causes sudden change in hydrogen generation rate. This typically occurs when there is a surplus of a liquid reactant or the reactant is not contained properly at the desired reaction zone of a system. The surplus or leaking reactant is typically pooled at the bottom of the fuel by gravity. This pooled reactant starts unwanted SBH hydrolysis at a location away from the reaction zone, resulting in the uncontrolled fuel consumption. This orientation-dependency issue is the best overcome by combining the embodiment of the MBI 308 (see FIGS. 3c-3d) and the use of symmetrical guide for product removal spiral channels 510 (see FIG. 5c).

According to another aspect of the invention, designs and materials for multi-step filtration of highly viscous products are provided, where the highly viscous products result from hydrolysis of a sodium borohydride reaction. Hydrogen gas needs separation from other products of SBH hydrolysis, but the separation, i.e filtration, becomes more challenging with the highly viscous SBH product. The hydrolysis of SBH generates hydrogen and boron oxides that have relatively low solubility in most liquid reactants (such as water). Furthermore, since a non-liquid fuel mixture reacts at a near-stoichiometric ratio of the fuel and a liquid reactant (e.g. water), the SBH hydrolysis generates highly viscous products. This highly viscous product is likely to result in a high-pressure drop across filters or even clogging in the filters. Additionally, the presence of hydrogen gas in the reaction products forms gas bubbles within the product, causing the products to be highly voluminous and leading to storage and space issues.

Figure 6:
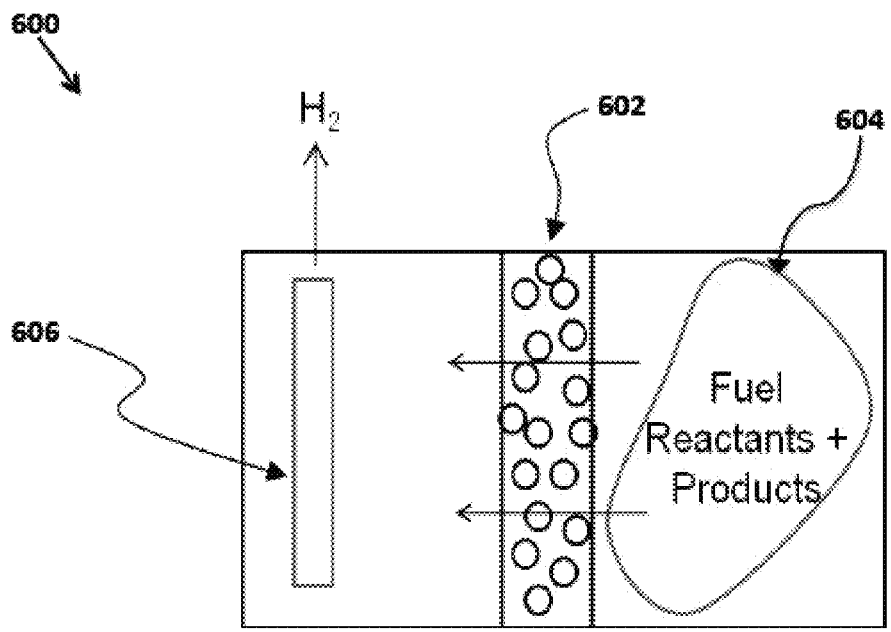
FIGS. 6a-6c show schematic diagrams of layout variations of product separation media according to the present invention.
Figure 6:
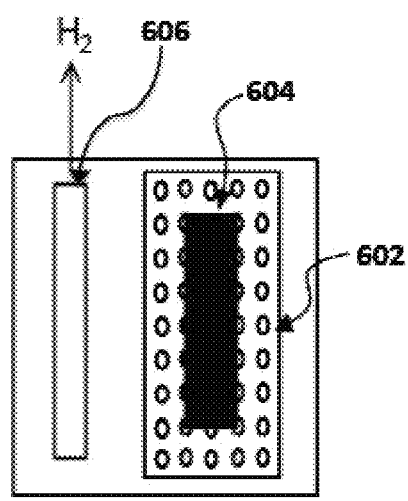
Figure 6:
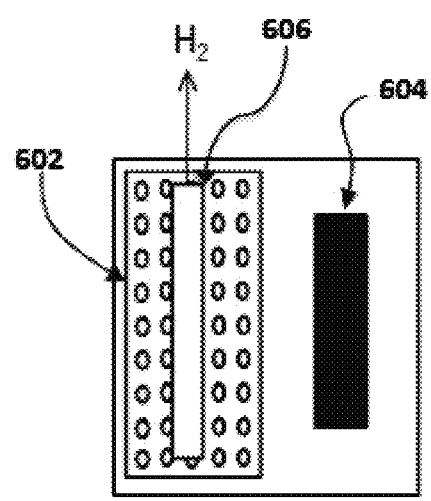

In order to avoid this filter failure, the invention provides a filter set that separates, retains, and degasses the reaction products. Due to space constraints within the hydrogen generator system, the filter set may additionally be compressible such that over the course of operation, the filter set expands as it retains more reaction products. The filter set has single or multiple layers of product separation media installed between a fuel mixture and a gas separating membrane. FIGS. 6a-6c show schematic drawings of some layout variations 600 of product separation media 602, including product separation media 602 disposed between a mixture of fuel and products 604 and a gas separating membrane 606, and enclosing a fuel mixture and products 604, or enclosing a gas separation filter 606. The layout of a fuel mixture 604, product separation media 602, and gas separating membrane 606 can be optimized for the best filter performance. In one embodiment, a porous (open cell) foam structure 602 is placed between a fuel mixture 604 and a gas separating membrane 606 such that all products from hydrogen reaction are separate from the gas membrane 606 (see FIG. 6*a*). In another embodiment, a fuel mixture 604 is enclosed in a hydrophobic (more preferred) or hydrophilic foam structure 602 through which hydrogen gas passes, leaving any gas bubble, liquid, or solid products within the foam structure 602 (see FIG. 6*b*). This enclosure-style product separation medium localizes a liquid reactant close to an unreacted fuel mixture to minimize any runaway of the liquid reactant without participating hydrogen reaction. According to another embodiment, when there is less need for localizing the liquid reactant, then a gas separation medium 606 can be enclosed by a product separation medium 602 to prevent any contamination by products from the reaction (see FIG. 6*c*). Additional foam (not shown) such as open cell, single or multiple, hydrophilic or hydrophobic, can be applied either inside or outside the first open cell foam 602 structure to minimize any product leakage through the first foam structure 602.

Figure 7:
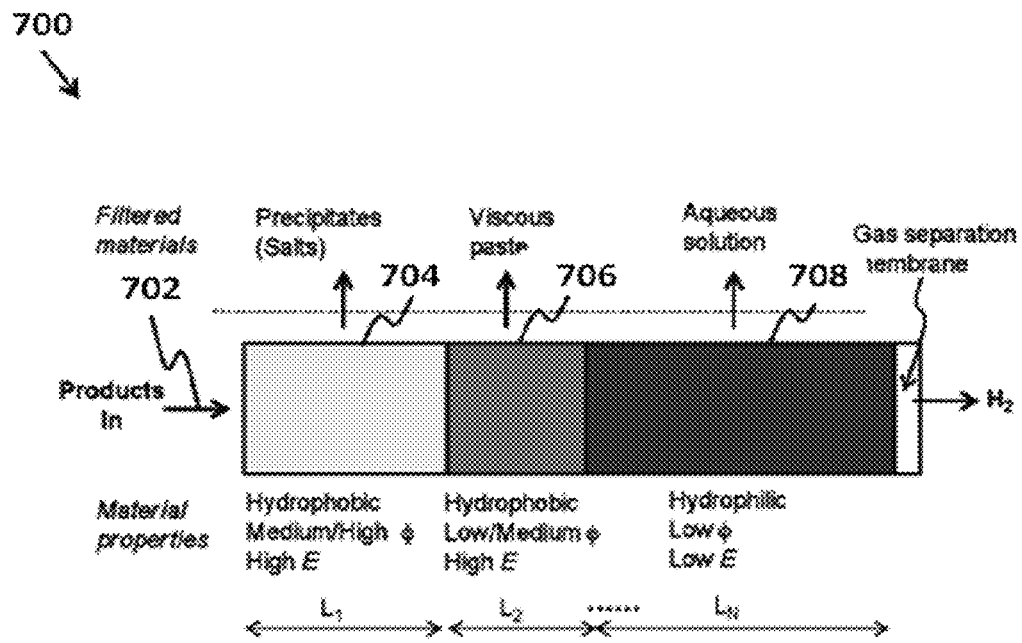
FIG. 7 shows a schematic diagram of a multi-stage filter configuration according to the present invention.

In addition to the layout variations 60*o* provided above, the current invention provides specific design and selection of filter materials for the highly viscous products from SBH hydrolysis. Products from the current sodium borohydride (SBH) mixture consist of precipitated particulates (mostly boron oxide salts), hydrogen gas, and highly viscous paste (mixture of boron oxide salts, acid accelerators, surplus of water, and other additives). These products of different physical properties need to be filtered out using multiple steps. According to another embodiment, FIG. 7 shows a schematic drawing of a multi-stage filter configuration 700. Here, $\phi$ is porosity, E is Young's modulus, and $L_N$ indicates the length of each filter stage. Product enters filter set 700 through the most hydrophobic and stiff filter with the highest porosity, then is sequentially filtered out until only $H_2$ gas remains. As shown in FIG. 7, the particulate product 702 is filtered first by the largest pores 704 of hydrophobic porous structures, wherein the hydrophobic pores break the surface tension of the gas bubbles to condense the products. After this first filtering, only gas, de-bubbled viscous paste, and liquid are able to pass to the next filter material 706. This first filter 704 (hydrophobic and containing large pores) is also selected to have higher mechanical stiffness to avoid compression that might lead to substantial closure of the pores. As a material for the next stage filter 706, relatively hydrophilic and fibrous material, is selected. This material filters any aqueous substance and allows only hydrogen gas to pass through the material. At the final stage, a gas separation filter 708 (e.g. ePTFE filter) is used to allow pure hydrogen gas to exit the system. Number, volume, and types of filters at each stage can be custom-adjusted to meet the required performance of filtration for products with varying properties.

According to another embodiment, a multi-stage filter for product separation can include a stiff hydrophobic material with high porosity (filter #1), a stiff hydrophobic material with medium porosity (filter #2), and a soft hydrophilic material with low porosity (filter #3). Preferably, the filter #1 is placed at a product entrance to filter large particulates, then the filter #2 to filter viscous pasty components of products, and the filter #3 is placed at the last place to absorb any liquid. Typically, a gas separation membrane (e.g. silicone, PTFE, or ePTFE based materials) is placed after filter #3. However, the multi-stage filter may have any number of hydrophilic, hydrophobic, porous or fibrous filters (with any porosity or fibrosity) arranged in any configuration. The hydrophobic porous materials can include synthetic nylon wools, silicone foams, rubber foams, polyethylene foams, viton foams, polyurethane foams, neoprene foams, vinyl foams, or any other suitable material. The hydrophilic materials can include acryl yarns, polyimide foams, carbon felts, polypropylene felts, or any other suitable material. A exemplary set of filters includes about 10~20% (w/w) of a synthetic nylon wool (grade #2 coarse, McMaster Carr, Calif.) as a filter #1, about 10~40% (w/w) of another synthetic nylon wool (grade #1 medium, McMaster Carr, Calif.), and about 40~80% (w/w) synthetic acryl yarn (4 medium, Lion Brand Yarn Company, NY).

Figure 8:
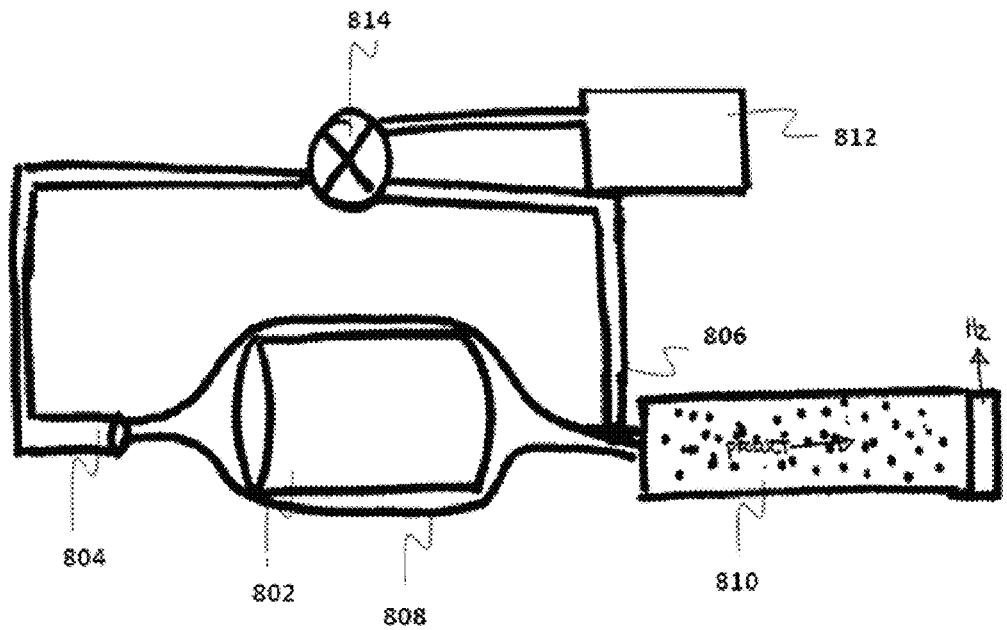
FIG. 8 shows a schematic diagram of an embodiment of the hydrogen generator with an auxiliary liquid delivery media.

As the solid fuel mixture is consumed to generate hydrogen, the length of the reaction product guide (and, in some embodiments, the area of the reaction zone) decreases. This leads to variations in reaction stoichiometry (i.e. amount of hydrogen flow per liquid fuel flow). For optimum solid fuel utilization and product separation, it is beneficial to adjust the overall reaction stoichiometry by implementing an auxiliary LDM and controlling it based on a filter control number (FCN). As shown in FIG. 8, the hydrogen generator system preferably includes one or more auxiliary LDMs 806 disposed at the end of the reaction chamber 808 opposite the primary LDM 804, but may alternatively and/or additionally include auxiliary LDMs disposed along the product guide path or within the product separation media. The auxiliary LDM may be a nozzle, wick, tube, or spray, and can be a rigid or flexible medium including single or multiple of rods, tubes, bars, or sheets. Delivery of a liquid reactant to a fuel mixture can be achieved by direct injection, dripping, spraying, or wetting of the auxiliary LDM.

The hydrogen generator of the preferred embodiments operate the flow rates of the primary and auxiliary LDMs based on a filter conditioning number (FCN), wherein the FCN is indicative of the condition of the filter (e.g. clogged due to a thick SBH product, flooded due to a thin SBH product, or operating optimally) as well as the stoichiometry of the reaction. Use of the FCN functions to keep the viscosity of the SBH product within an optimal range for filter operation (e.g. product retention), as well as ensure that the solid fuel mixture is substantially reacted. The FCN is calculated as a ratio of the amount of overall liquid reactant dispensed to the amount hydrogen gas produced, or as the ratio of the overall liquid reactant flow rate to the hydrogen generation rate. The amount of overall liquid reactant dispensed (primary and auxiliary) over a given period of time may be determined from the sum of primary and auxiliary liquid reactant flow rates, which, in turn, is determined from measuring a LDM operation parameter (e.g. the pumping rate of a liquid reactant pump) of each LDM or the system. The amount of liquid reactant dispensed may also be determined from the initial and immediate liquid reactant volumes within the liquid reactant storage. The amount of hydrogen gas produced over a given period of time may be determined from the hydrogen gas generation rate, which, in turn, may be determined by the power output (i.e. the voltage and/or current output) or by the hydrogen flow rate out of the hydrogen generator system. The primary and auxiliary LDMs may additionally be used to control the both hydrogen flow rate and the FCN; in one preferred embodiment, the primary LDM is used to achieve a desired hydrogen flow (i.e. production) rate, while the auxiliary LDM is used to achieve a desired FCN.

Depending on the FCN and the state of operation, the reaction products may be thinned (i.e. the FCN raised) or thickened (i.e. the FCN lowered) by dispensing various amounts of additional liquid reactant from the auxiliary LDMs as needed. The dispensing rate of the primary LDM may also be altered to dispense more or less liquid reactant into the system to achieve the desired FCN. The FCN may be calculated by a processor (e.g. a CPU) which may also measure and control the liquid reactant flow rate and hydrogen generation rate (e.g. control a liquid reactant pump and an auxiliary current load cell coupled to the hydrogen generator, respectively). Alternately, the FCN may not be computed during the operation of the hydrogen generator system at all, but the adjustments that would have been implemented based on the FCN are instead an inherent property of the elements used in the system. For example, the mechanism of the liquid reactant pump (e.g. a nitinol-powered pump, as described in U.S. patent application Ser. No. 11/203,001, which is incorporated in its entirety by this reference) may be coupled to the mechanism that measures the hydrogen generation rate (e.g. a load cell that measures current output). In this example, the pump inherently responds to changes in the hydrogen generation in a desired manner (e.g. the current measured by the load cell drives the nitinol pump through a transformer, such that a low measured current, indicative of a need for more liquid reactant in the reaction, causes a large deformation of the nitinol that results in more liquid reactant being pumped into the reaction zone). The LDM may alternately be coupled to a switch, wherein the switch is coupled to the hydrogen generation measurement and is configured to switch the LDM from a closed state to an open state upon detection of a given hydrogen generation measurement.

Primary and auxiliary LDMs preferably have individual pumps driving the dispensing rate, but may alternatively be driven by a single pump with a mechanism that determines the ratio of flow rates to the primary and auxiliary LDMs (e.g. a processor). The target FCN is preferably kept between 500 and 1700, more preferably between 900 and 1100 and most preferably at 1000.

Figure 14:
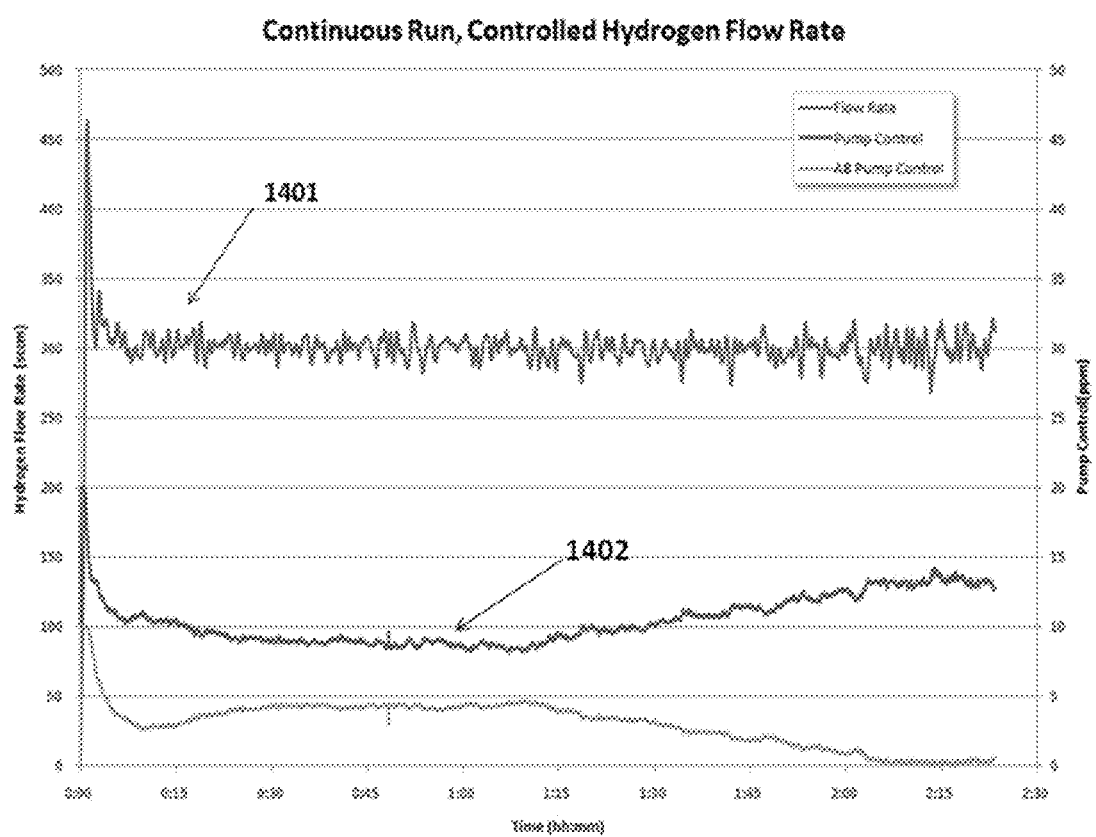
FIG. 14 shows an example of a hydrogen generation profile resulting from the utilization of a primary and auxiliary LDM in the hydrogen generator.

FIG. 14 shows a sample run of the hydrogen flow rate 1401 and the pump control parameter 1402 (pump rate in strokes per minute) of a fuel generator utilizing a primary and an auxiliary LDM. The liquid flow rate of the primary LDM was adjusted to maintain a constant flow rate of 300 sccm of hydrogen while the flow rate of the secondary LDM was adjusted to maintain a FCN of 1000. The product consistency flowing from the reactor into the fluid junction (wherein the fluid junction includes the auxiliary LDM) changed from dry at the beginning of the run to liquid at the end of the run. The dry product consistency at the beginning of the run prompted a high flow rate from the auxiliary LDM to thin the product until an ideal consistency is achieved, at which point the flow rate from the auxiliary LDM is lowered, as the secondary liquid reactant flow is no longer needed.

In a preferred embodiment of the invention, a fuel mixture includes a fuel (sodium borohydride), acidic accelerators (acids such as malic acid, boric acid, succinic acid, or oxalic acid), a liquid distributing agent (polyethylene glycols, compressible sugars, poly saccharides, or glass fibers), and a binder (polyethylene glycol, poly saccharides, alginic acid, or cellulose). This mixture can either be compacted to form a solid structure such as a rod, cylinder, rectangle, micro-/macro-spheres or other forms, or be in its powder form, when the powder mixture is packaged in a fuel pack. Table 1 shows several examples of solid fuel mixtures that are preferably used, but other compositions and mixtures that react to produce hydrogen gas may alternately be used.

TABLE 1

| No | Fuel | Accelerator | Liquid distributor/Binder | Anti-caking | Anti-foam |
|----|------|-------------|---------------------------|-------------|-----------|
| 1 | SBH (15 g) | Succinic Acid (15 g) | Compressible sugar (1 g) | Silica (0.3 g) | n/a |
| 2 | SBH (15 g) | Boric Acid (15 g) | Compressible sugar (1 g) | Silica (0.3 g) | n/a |
| 3 | SBH (15 g) | Boric Acid | PEG 6000 (1 g) | Silica (0.3 g) | n/a |
| 4 | SBH (15 g) | Malic Acid (15 g) | Compressible sugar (1 g) | Silica (0.3 g) | n/a |
| 5 | SBH (15 g) | Malic Acid | PEG 6000 (1 g) | Silica (0.3 g) | n/a |
| 6 | SBH (20 g) | Malic Acid | PEG 6000 (1 g) | Silica (0.3 g) | n/a |
| 7 | SBH (20 g) | Malic Acid | PEG 6000 (1 g) | Silica (0.3 g) | (0.3 g) |

*Note)
SBH (Sodium Borohydride), PEG 6000 (Polyethylene Glycol, Mw = 6,000), Antifoam (Dow Corning Brand)

Figure 9:
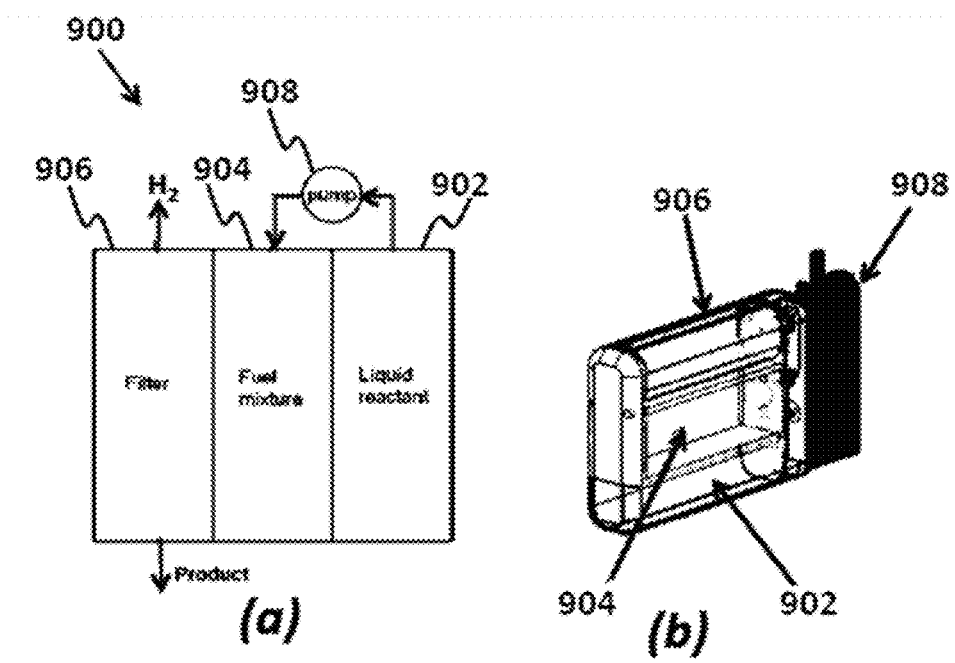
FIGS. 9a-9b show a schematic diagram and a CAD model, respectively of a hydrogen generation system having a liquid reactant chamber, fuel chamber, filter chamber, and pump according to the present invention.

FIGS. 9a-9b show a schematic and a CAD model, respectively, of the current embodiment of a hydrogen generator system 900 that includes a liquid chamber 902, a fuel chamber 9, a filter chamber 906, and a pump 908. The liquid chamber 802 contains a plastic bag made out of polyethylene/BON material that stores deionized water. The DI water is pumped into the fuel chamber 904 and reaches an LDM (not shown). Hydrogen reaction occurs in the fuel chamber 904 at a defined reaction zone, then the resulting products flow into the filter chamber 906 that contains product separation media. The products are filtered out and only hydrogen gas exits the hydrogen generator system 900.

In a further embodiment, hydrogen generation is regulated by pumping of a liquid reactant, preferably filtered water. In one embodiment of the present invention, the pump is a diaphragm pump and the delivery of liquid is controlled by on/off, stroke volume, and pumping frequency. With a predetermined stroke volume, the rate of hydrogen generation is mainly controlled by pumping frequency. In order to increase a hydrogen generation rate, the fuel cell sends a signal for an increased pumping frequency for accelerated hydrogen generation. Other types of pumps suitable for a hydrogen generator system include peristaltic pumps, and electro-osmotic (EO) pumps. The on/off, stroke volume and pumping frequency is preferably controlled by a controller electrically coupled to the pump. The controller is preferably a CPU, but may alternatively be a switch or a logic gate as well.

Figure 10:
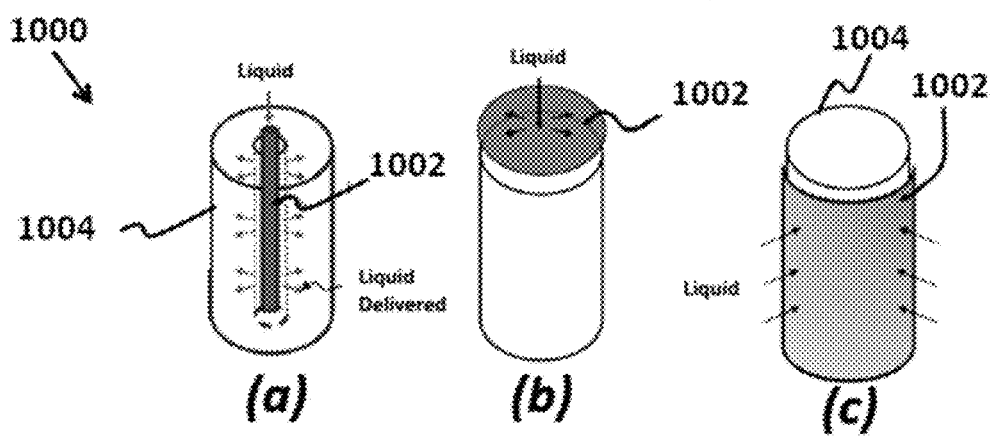
FIGS. 10a-10c show schematic diagrams of a preferred assembly of an LDM and fuel mixture in a form of a nozzle, plane, or envelope, respectively according to the present invention.

According to the current invention, a liquid-delivery medium (LDM) can be a nozzle, porous media, wicking fibers, wicking foams, or wicking fabrics such that any liquid flowing into the LDM can spread out uniformly to the fuel mixture. FIGS. 10a-10c show schematic diagrams of some assemblies 1000 of an LDM 1002 and fuel mixture 1004 in a form of a nozzle, a plane, or an envelope, respectively. Specifically, an LDM 1002 can be inserted into a conduit of a solid fuel 1004 (see FIG. 10a), assembled at one side of a solid fuel 1004 (see FIG. 10b), enclose a solid fuel 1004 like an envelope (see FIG. 10c) in contact or proximal to a surface of the solid fuel 1004.

Figure 12:
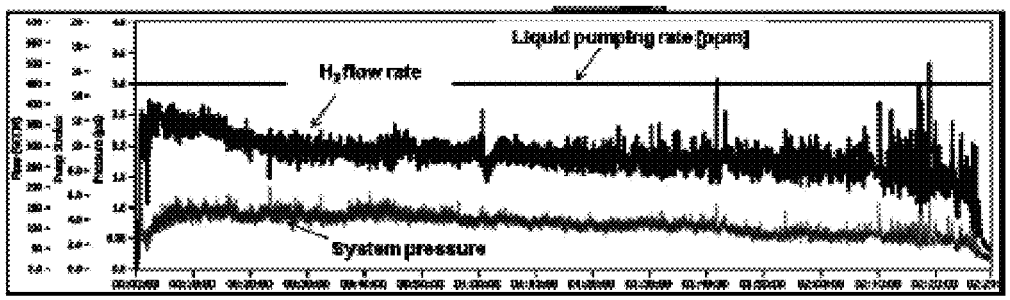
FIG. 12 shows a graph of $H_2$ evolution profile of balloon membrane fuel reactor and serial filter set comprised of nylon wools and acryl yarn according to the present invention.

In one exemplary embodiment of the invention, a fuel mixture was prepared by grinding and mixing each component at a pre-determined mixing ratio. In this example, 15 gram of succinic acid, 1 gram of compressible sugar, 0.3 gram of silica, and 15 gram of sodium borohydride were weighed and poured into a grinding bowl. After uniform mixing under a dry condition, preferably in a humidity-controlled glove box, the powder mixture was poured into a compaction mold. Then, the powder mixture was compressed under a pressure of around 1,000~2,000 psi to form a compacted cylinder with a conduit at its center. This compacted fuel pill was assembled with a nozzle type LDM 902 (see FIG. 9*a*), gas separating membrane, and tubes in a plastic bag. A predetermined amount (typically 30~60 mL) of distilled water was stored in a separate bag and connected via a diaphragm pump to the liquid nozzle. A pumping stroke was set at 0.035 mL/stroke and the pumping frequency was set at 10 strokes/minute. The hydrogen gas was dehydrated through a drying column filled with desiccants, then the flow rate was measured using a flow meter. The pump was controlled by a controller and the flow rate and other relevant data were collected and recorded. The FIG. 12 shows the flow rate of hydrogen generated at a constant pumping rate, where shown is the $H_2$ evolution profile of an embodiment of the solid fuel mixture.

Figure 13:
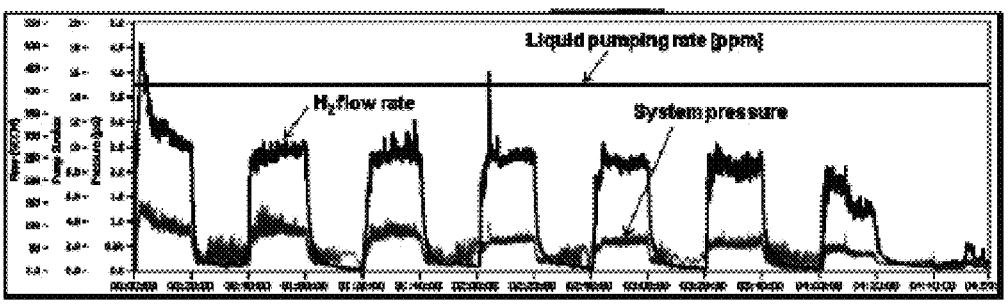
FIG. 13 shows an example of hydrogen evolution profile of $H_2$ pack with elastic enclosure during dynamic test with 20 min On/20 min Off cycle according to the present invention.

According to another exemplary embodiment of the invention, fuel mixture contained 20 gram of sodium borohydride, 10 gram of malic acid, 1 gram of PEG6000 (Polyethylene Glycol, Mw=6,000), and 0.3 gram of silica was used. Other conditions were the same as the previous example. FIG. 13 shows the flow rate and cumulative amount of hydrogen generated at a constant pumping rate, where shown is the $H_2$ evolution profile of Mixture No. 6 from TABLE 1 (SBH tog, Malic acid 10 g, PEG 6000 1 g, Silica 0.3 g) X-axis indicates time in [hr:min:sec] and Y-axis indicates hydrogen flow rate in [sccm]. The cumulative amount of hydrogen produced over time is depicted in liters and percentage of total theoretical amount.

According to a further exemplary embodiment of the current invention, the fuel mixture contains 20 gram of sodium borohydride, 10 gram of malic acid, 1 gram of PEG6000 (Polyethylene Glycol, Mw=6,000), and 0.3 gram of silica. Other conditions were the same as the previous example. The orientation of the fuel bag was changed at multiple time points, such as 1 hr 20 min, 2 hr 32 min, and 3 hr. FIG. 14 shows the flow rate and cumulative amount of hydrogen generated at a constant pumping rate, where shown is the $H_2$ evolution profile of Mixture No. 7 from TABLE 1 (SBH 20 g, Malic acid 10 g, PEG6000 1 g, Silica 0.3 g). Orientation was changed at times, 1 hr 20 min, 2 hr 32 min, and 3 hr. X-axis indicates time in [hr:min:sec] and Y-axis indicates hydrogen flow rate in [sccm]. The cumulative amount of hydrogen produced over time is depicted in liters and percentage of total theoretical amount.

Figure 11:
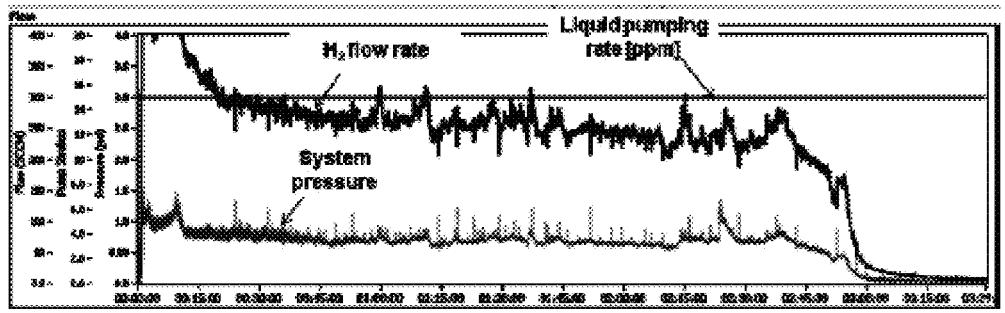
FIG. 11 shows a graph of $H_2$ evolution profile of $H_2$ generation system when planar type of LDM made of synthetic polypropylene felt was used according to the present invention.

According to another exemplary embodiment of the invention, a synthetic polypropylene felt (McMaster Carr, Calif.) was used as a planar LDM 1002 and placed in one side of a cylindrical fuel pill 1004 (see FIG. 10*b*). Then the pill was under a compression force by a spring from the other side of the fuel pill 306 (see FIG. 3*a*). The fuel mixture contained 20 gram of sodium borohydride, 10 gram of malic acid, 1 gram of PEG6000 (Polyethylene Glycol, Mw=6,000), and 0.3 gram of silica. Other conditions were the same as the previous example. Shown in FIG. 11, hydrogen gas was generated at a stable flow rate of between 250 and 300 sccm for about 3 hrs, while maintained relatively low pressure buildup (1 psi or lower) within the system. Specifically, FIG. 11 shows a $H_2$ evolution profile of H2 generation system when planar type of LDM made of synthetic polypropylene felt was used. Mixture No. 7 (SBH 20 g, Malic acid 10 g, PEG6000 1 g, Silica 0.3 g) was used as a fuel mixture. Orientation was maintained without a change.

In yet another exemplary embodiment of the invention, a cylindrical solid fuel 306 is placed in an elastic balloon membrane 308 that has an inlet for liquid reactants 310*a* and outlet for products to exit 310*b* (see FIG. 3*c*). A straight channel 508 as a product path is structured on the surface of the solid fuel 504 (see FIG. 5*b*). The solid fuel contained 20 gram of sodium borohydride, 10 gram of malic acid, 1 gram of PEG6000 (Polyethylene Glycol, Mw=6,000), and 0.3 gram of silica. A serial filter set used in this experiment was comprised of 3 grams of synthetic nylon wool (grade #2 coarse, McMaster Carr, Los Angeles) for the first stage to filter large particulates, 5 grams of synthetic nylon wool (grade #1 medium, McMaster Carr, Los Angeles) for the second stage to filter viscous pasty components, and 7 grams of acryl yarn (4 medium, Lion Brand Yarn Company, NY). Other conditions were the same as previous embodiments. $H_2$ flow rate from this configuration is shown in FIG. 12, where shown is a $H_2$ evolution profile of balloon membrane fuel reactor and serial filter set comprised of nylon wools and acryl yarn.

According to another exemplary embodiment of the invention, a hydrogen generation system described in the previous example was tested under a dynamic condition where a liquid reactant pumping into the system was on for 20 min and off for 20 min. The dynamic performance of the stop/start is shown in FIG. 13. Instantaneous start and stop upon pump on/off was demonstrated, where shown is an example of a $H_2$ pack with elastic enclosure during dynamic test with 20 min On/20 min Off cycle. Startup and Stop behaves identical every cycle longer than 4 hours of operation until its completion (100% yield of $H_2$).

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example acid accelerators can be replaced or combined with metal catalysts. The presented invention can be applied to any chemical hydride reacting with any liquid reactant. The multi-stage filter set can be configured in serial, parallel, or combination of serial and parallel steps. Assembly sequence of each filter material can be altered for optimal performance. Physical form of a fuel mixture can be cylindrical, planar, annular, cubic, rectangular, particles, microspheres, beads, pallets, powder, or paste. Acid accelerators can be incorporated in a fuel mixture, or dissolved in the solution of a liquid reactant. Liquid delivery medium (LDM) can be in contact or proximate to the unreacted surface of a fuel mixture. LDM can be hydrophilic or lipophilic. LDM can have relatively large pores or small pores. A hydrogen generation system has a single or multiple LDMs at single or multiple locations. The LDM can have a variety of form factors. Solubility modifying agents for hydrolysis products of sodium borohydride can be included in a fuel mixture, filter set, or saturated in the solution of liquid reactants. Liquid reactants can be preheated to assist the resuming function of the system after being turned off. Reaction zone or interface can be preheated to assist the resuming function of the system after being turned off. Heat generated from the exothermic reaction of sodium borohydride reaction can be stored and utilized to assist resuming function after the system being turned off. Heat generated from the exothermic reaction of sodium borohydride reaction can be utilized to preheat liquid reactants. Heat generated from the exothermic reaction of sodium borohydride reaction can be utilized to heat filtration area to lower viscosity of product flowing through filer materials.

All such variations are considered to be within the scope and spirit of the present invention as defined by the following claims and their legal equivalents.

We claim:

1. A hydrogen generator comprising: a solid fuel mixture; a liquid reactant; a liquid delivery medium (LDM); a movable boundary interface (MBI); a reaction zone, wherein the MBI provides constant contact between a reacting surface of the solid fuel mixture and the liquid reactant delivered by the LDM to form the reaction zone; and a product separation media, fluidly coupled to the reaction zone by a fluid junction, that degasses a product; wherein the product separation media comprises of porous foam and the pore size of the product separation media decreases with increasing distance from the fluid junction.

2. The hydrogen generator of claim 1 further comprising a secondary LDM that controls a ratio of liquid reactant delivered to hydrogen generated.

3. The hydrogen generator of claim 2, wherein the secondary LDM delivers the liquid reactant to the fluid junction.

4. The hydrogen generator of claim 1, wherein the product separation media further comprises a hydrogen separator.

5. The hydrogen generator of claim 4, wherein the hydrogen separator comprises of ePTFE.

6. The hydrogen generator of claim 4, wherein the porous foam is disposed between the fluid junction and the hydrogen separator.

7. The hydrogen generator of claim 6, wherein the product separation media further comprises a fibrous filter.

8. The hydrogen generator of claim 7, wherein the fibrous filter is disposed between the porous foam and the hydrogen separator.

9. The hydrogen generator of claim 8, wherein the fibrous filter and the porous foam are disposed around the hydrogen separator such that the hydrogen separator is substantially enclosed by the fibrous filter and the porous foam.

10. The hydrogen generator of claim 8, wherein the porous foam is hydrophobic and the fibrous filter is hydrophilic.

11. The hydrogen generator of claim 10, wherein the porous foam comprises of nylon foam, the fibrous filter comprises of acrylic yarn, and the hydrogen separator comprises of ePTFE.

12. The hydrogen generator of claim 1, wherein the solid fuel mixture comprises of solid sodium borohydride.

13. The hydrogen generator of claim 1, wherein the liquid fuel reactant comprises of water.

14. A hydrogen generator comprising: a solid fuel mixture; a liquid reactant; a liquid delivery medium (LDM); a movable boundary interface (MBI); a reaction zone, wherein the MBI provides constant contact between a reacting surface of the solid fuel mixture and the liquid reactant delivered by the LDM to form the reaction zone; and a product separation media, fluidly coupled to the reaction zone by a fluid junction, that degasses a product, wherein the MBI comprises of an elastic membrane disposed about the solid fuel mixture.

15. The hydrogen generator of claim 1, wherein the product separation media comprises a fibrous filter.

* * * * *